(12) United States Patent
Meyer

(10) Patent No.: US 7,845,705 B2
(45) Date of Patent: Dec. 7, 2010

(54) DAMPING COMPONENT

(75) Inventor: Florian Meyer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 11 days.

(21) Appl. No.: 12/418,924

(22) Filed: Apr. 6, 2009

(65) Prior Publication Data

US 2010/0003450 A1 Jan. 7, 2010

Related U.S. Application Data

(60) Provisional application No. 61/077,940, filed on Jul. 3, 2008.

(51) Int. Cl.
*B60J 5/00* (2006.01)
(52) U.S. Cl. .................... 296/146.6; 296/39.3
(58) Field of Classification Search ............... 296/39.3, 296/146.6; 428/99, 304.4, 172, 192
See application file for complete search history.

(56) References Cited

U.S. PATENT DOCUMENTS

| | | | |
|---|---|---|---|
| 6,207,244 B1 * | 3/2001 | Hesch .................... | 296/146.6 |
| 6,447,047 B1 * | 9/2002 | Marcovecchio et al. .. | 296/146.6 |
| 6,543,838 B1 * | 4/2003 | Bertolini et al. .......... | 296/146.6 |
| 6,631,940 B2 * | 10/2003 | Dauvergne et al. ....... | 296/146.6 |
| 2002/0158486 A1 * | 10/2002 | Dauvergne et al. ....... | 296/146.6 |
| 2004/0113455 A1 * | 6/2004 | Schmidt ................... | 296/146.6 |
| 2007/0262612 A1 * | 11/2007 | Cowelchuk et al. ...... | 296/146.6 |
| 2009/0284041 A1 * | 11/2009 | Hall et al. ................ | 296/146.6 |

\* cited by examiner

*Primary Examiner*—Lori L Lyjak
(74) *Attorney, Agent, or Firm*—Muncy, Geissler, Olds & Lowe, PLLC

(57) ABSTRACT

A damping component (30) is disposable between a base component (42) and a panel component (10) attachable thereto. The panel component has an edge flange (12) ending in an edge (14) configured to be disposed adjacent to an opposing surface of the base component. The damping component comprises a body (32) disposable in a space defined between the base component and the panel component when the base component is attached to the panel component. The damping component further comprises a lip (34) extending from the body. The lip is disposable at least partially between the edge of the panel component and the opposing surface of the base component. Further, the lip is configured to prevent the edge of the panel component from directly contacting the base component when the base component is attached to the panel component.

19 Claims, 3 Drawing Sheets

DAMPING COMPONENT

CROSS-REFERENCE TO RELATED APPLICATIONS

The present application claims the benefit of U.S. Provisional Patent Application No. 61/077,940 filed Jul. 3, 2008, the entire contents of which are hereby incorporated by reference.

TECHNICAL FIELD

The present invention relates to a damping component configured to be disposed between a base component, e.g., a metal door plate of an automobile, and a panel component attached thereto in order to minimize or eliminate scraping, flapping or other noises typically generated between the base component and the panel component when they are fastened together.

BACKGROUND ART

In the automobile field, various base components made of sheet metal or other plate-like materials, such as components belonging to the chassis or vehicle body, are typically covered with panel components in order to impart an aesthetically-pleasing appearance to the passenger compartment. These panel components often also perform additional functions, such as e.g., absorbing impact forces during an accident, providing storage shelves or pockets, serving as retainers for switches and handles, etc.

For example, complex vibration stimuli occur during driving. These vibration stimuli cause relative movement between mutually-abutting points of the panel component and the base component. This relative movement can lead to the generation of unpleasant scrapping, creaking or flapping noises. Certain material pairings, such as a painted metal surface coupled to a plastic or leather surface of the panel component, are particularly prone to the generation of such annoying noises. Such noise generation may also be temperature- and/or humidity-dependent. Further, the connection between the panel component and the base component may be subject to strict tolerances, which if not met, lead to problems. For instance, increased or decreased pressure at the interface location between the panel component and the base component may cause an increase in noise generation between the two components.

In order to minimize such noises, it is known to mount adhesive strips or felt strips along the edges or borders of the panel component. However, this solution is relatively expensive and can lead to an aesthetically-displeasing appearance, if the strips are not precisely mounted or become detached at a later time.

SUMMARY OF THE INVENTION

There is a long-felt need in the art to overcome one or more of the above-noted problems in the art.

A damping component according to the present teachings is proposed herein, which prevents direct contact between the edge of the panel component and the opposing surface of the base component. Preferably, a lip is at least partially disposed between the edge of the panel component and the opposing surface of the base component. The damping component is preferably made at least partially of an elastic and/or foam material and preferably is at least partially elastically-compressed when disposed between the panel and base components.

When the damping component is disposed, e.g., between a metal plate of a vehicle door and a panel component, in particular with the lip of the damping component at least partially disposed between and separating the metal plate from the panel component, scrapping, creaking or flapping noises typically generated during operation of the vehicle can be significantly reduced or eliminated.

In addition to use in a vehicle door, a damping component of such design is also broadly applicable to other aspects of the vehicle, e.g., in a rear trunk lid or hatchback or in an instrument panel, as well as other technical fields for preventing or minimizing noises caused when connected or coupled components move relative to each other.

Additional embodiments of the invention are recited in the dependent claims.

Further features, objects and advantages of the present teachings will be readily appreciated by the skilled person after reading the following description in view of the appended claims and drawings.

DETAILED DESCRIPTION OF EXEMPLARY EMBODIMENTS

Figure 1:
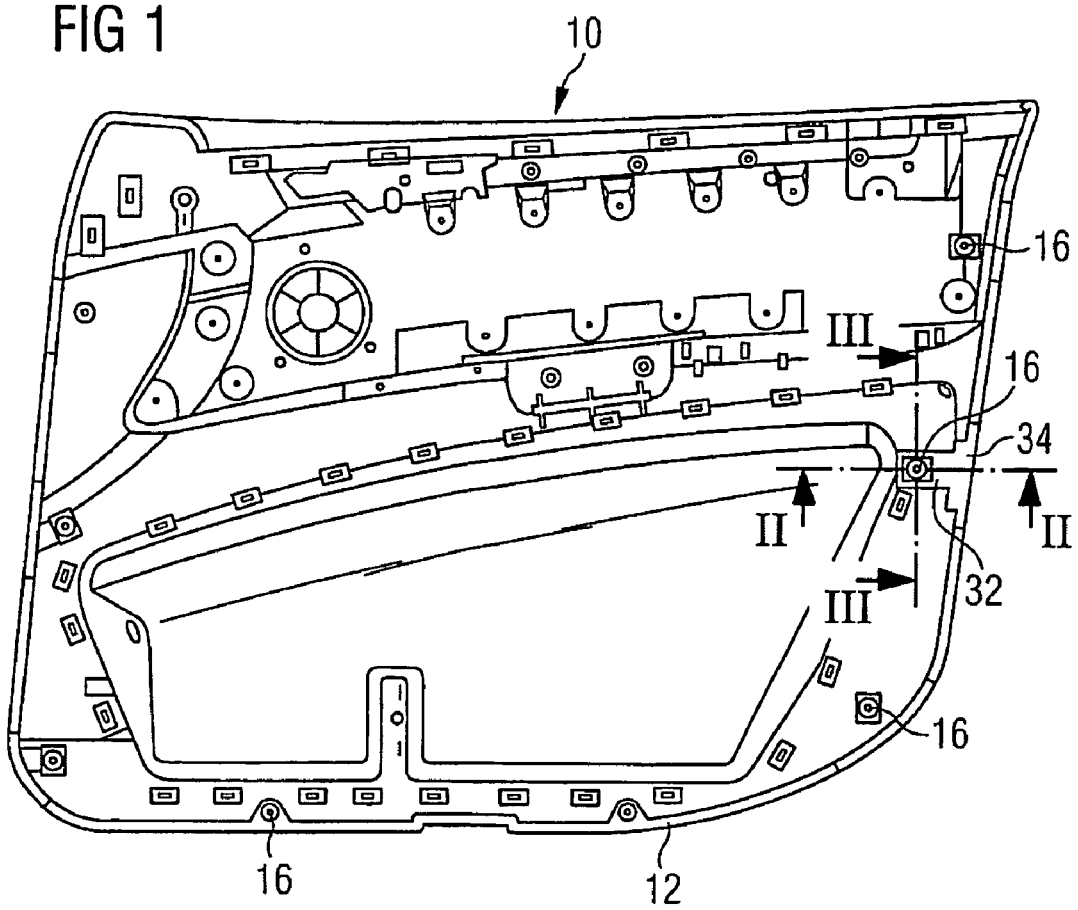
FIG. 1 shows an inner view of a door panel component.
Figure 2:
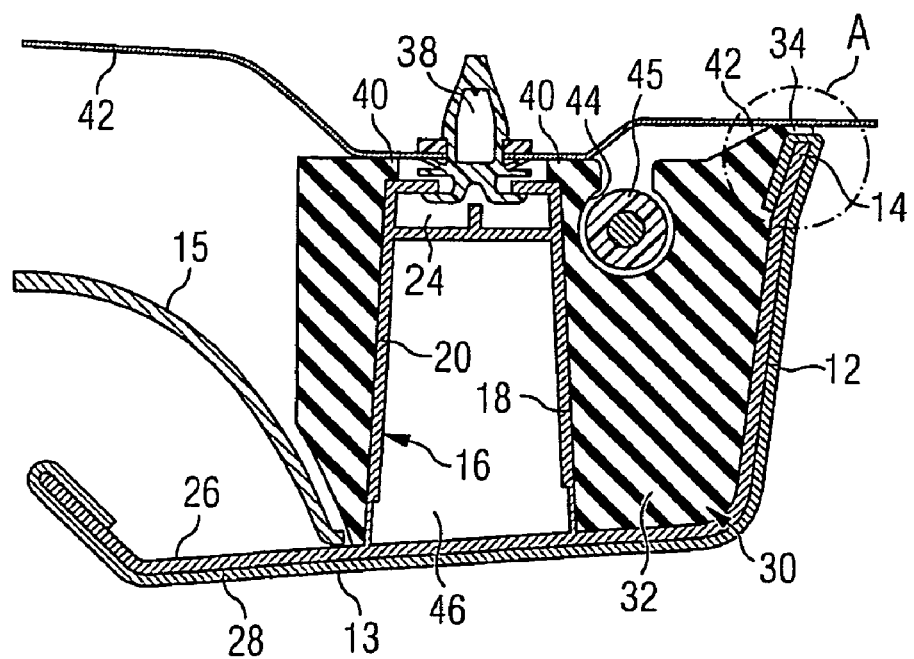
FIG. 2 shows a cross-sectional view along plane II-II indicated in FIG. 1, wherein the door panel component of FIG. 1 is attached to a door plate via a plunger pin, a bracket and a damping component.
Figure 3:
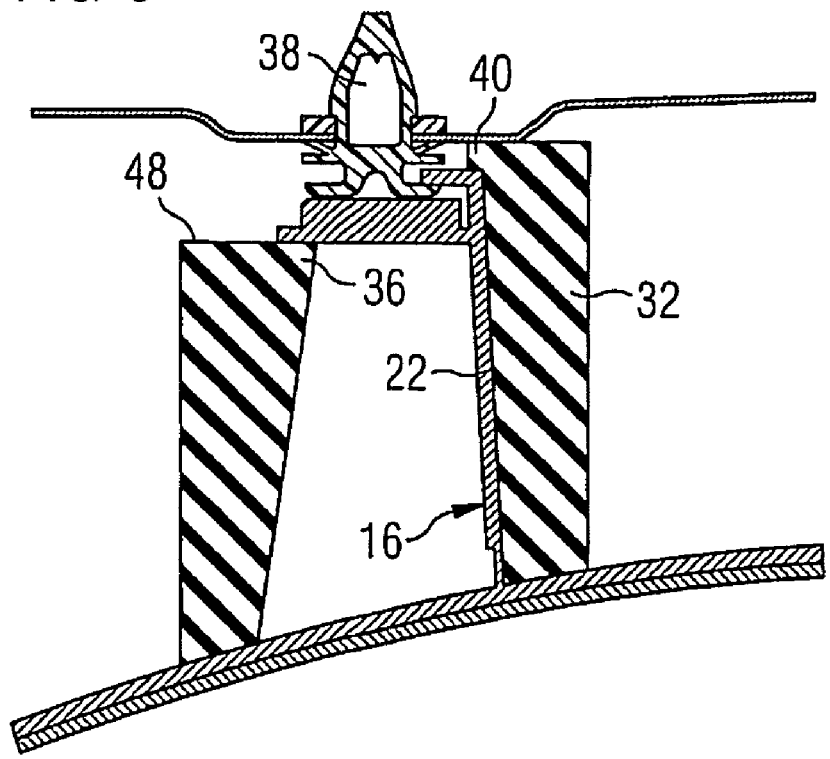
FIG. 3 shows a cross-sectional view along plane III-III indicated in FIG. 1, wherein a damping component surrounds and partially engages a bracket extending from the panel component of FIG. 1.

As shown in FIGS. 1 and 2, a door panel component 10 includes an edge flange 12 extending substantially perpendicularly or slightly obtusely from a base portion 13 of the door panel component 10. The inner side of the panel component 10, which faces towards a metal door component (door plate) 42 in the representative exemplary embodiment, is visible in FIG. 1. The door plate 42 shown in FIGS. 2-4 is one non-limiting example of a base component according to the present teachings.

Figure 4:
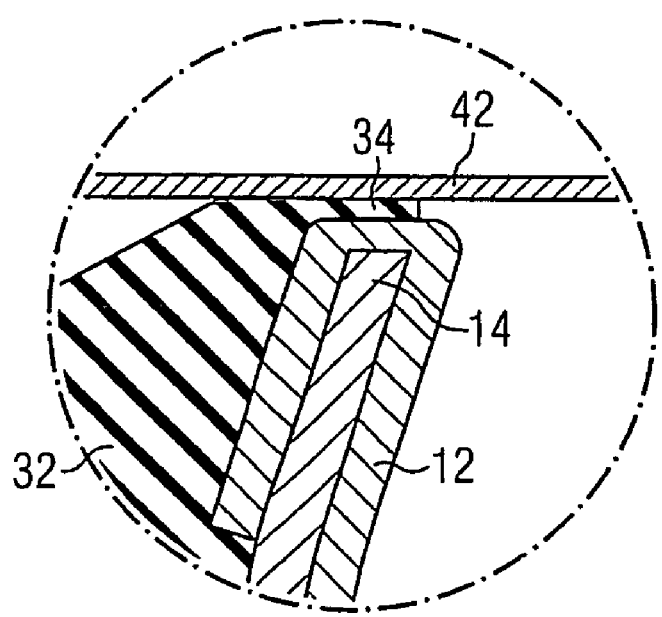
FIG. 4 shows an enlarged view of circle A shown in FIG. 2.
Figure 5:
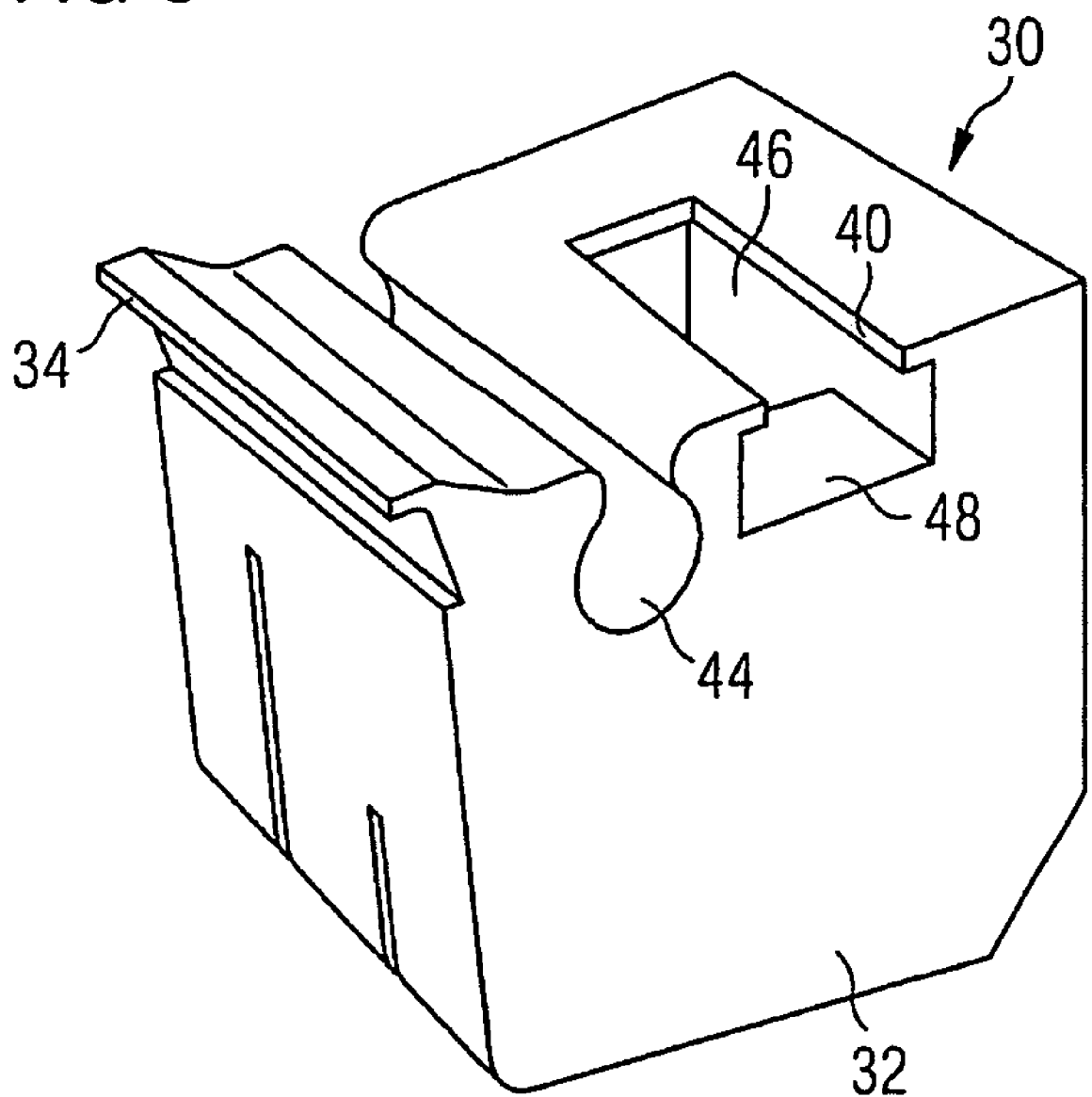
FIG. 5 shows a perspective view of a representative damping component.

The edge flange 12 extends, e.g., around, or substantially around the entire periphery of the door panel component 10 and ends at an edge 14, as shown in FIGS. 2 and 4. The edge 14 is disposed adjacent to an opposing surface of the metal door component 42 when the door panel component 10 is mounted on the metal door component 42.

In this representative, non-limiting example of the present teachings, the door panel component 10 is a relatively-large, substantially-flat, shaped panel. For example, the door panel component 10 may at least partially include or may be comprised of a molded component. In this case, at least one layer of the door panel component 10 may comprise, e.g., one or more synthetic materials or a composite material made of pressed natural fibers and synthetic resin, as is well known in the art. The door panel component 10 is preferably contoured in a three-dimensional manner, so that it lends an aesthetically-pleasing appearance to the passenger compartment. In addition, a lower portion of the door panel component 10 may include, e.g., a storage compartment or storage pocket 15.

The door panel component 10 may be attached to the door plate 42 by brackets 16. The brackets 16 are located on, attached to or formed on the door panel component 10 in a known manner. FIG. 2 shows a cross-section through one such bracket 16 along plane II-II indicated in FIG. 1. FIG. 3 also shows a cross-section through the bracket 16, but instead along plane III-III indicated in FIG. 1.

In this exemplary example shown in FIGS. 2 and 3, the bracket 16 includes opposing first and second supporting walls 18, 20 spaced in the longitudinal direction of the vehicle (i.e. in the horizontal direction according to FIG. 1). The first and second supporting walls 18, are connected to each other by a third supporting wall 22, so that the bracket 16 is open on one vertical side, as is best shown in FIG. 3. A covering or top wall 24 of the bracket 16 is preferably embodied as a double-walled structure, although more or less upper or top walls may be utilized. For example, the bracket 16 may have a single top wall 24 or a three-layered top wall 24. The top wall 24 preferably at least partially closes the bracket 16 at the top thereof and/or at the end facing away from the door panel component 10.

However, the door panel component 10 and the door plate 42 may be coupled together in a variety of methods known in the art. Further, the brackets 16 described herein are only intended to be examples, and many variations of the brackets may be implemented to couple the door plate 42 to the door panel component 10.

As is further apparent from FIG. 2, in a representative, non-limiting example of the present teachings, the door panel component 10 is comprised of a covering layer 28 attached to or laminated on a supporting layer 26. The supporting layer 26 may be formed in the manner discussed above; e.g., it may be a pressed material and/or a molded material as is known in the art. The covering layer 28 may be comprised, e.g., of one or more of leather, synthetic material and/or another covering material that provides an aesthetically-pleasing outer covering facing towards the passenger compartment of the vehicle.

Referring now to FIGS. 2-5, a representative damping component 30 is disposed in the space that is at least partially defined by the inward-facing surfaces of the edge flange 12 and the base portion 13 of the door panel component 10. The damping component 30 preferably comprises at least a lip 34 formed on and/or extending from a body 32.

The body 32 and/or the lip 34 of the damping component 30 are preferably at least partially formed from or comprised of a foam or other sponge-like material. More generally, the damping component 30 preferably comprises an elastically-resilient material that is capable of reducing, eliminating and/or absorbing scraping, creaking or flapping noises that may be generated under varying environmental conditions (e.g., temperature, humidity, etc.) by the contacting surfaces of the door panel component 10 and the door plate 42 when the vehicle is operating. The material of the damping component 30 may be advantageously selected based upon the materials utilized for the door panel component 10 and the door plate 42. For instance, many polyurethane foams ("PUR foam") may have desirable properties.

In a particularly preferred embodiment, when the damping component 30 is not disposed between the door panel component 10 and the door plate 42, the body 32 may have a length in the vertical direction (as shown in FIGS. 2-4) that is greater than the distance between the base portion 13 of the door panel component 10 and the door plate 42. Thus, if the body 32 is made of an elastically-resilient material, the damping component 30 will be slightly compressed between the facing surfaces of the door panel component 10 and the door plate 42 when the damping component 30 is installed therebetween. For instance, PUR foams having an elasticity of 10-1000 MPa may provide desirable performance in exerting an outward force on the coupling between the door plate 42 and the door panel component 10.

In an advantageous embodiment, the lip 34 can be integrally formed with the body 32, such that the damping component 30, i.e. inclusive of the body 32 and the lip 34, is a one-piece or integral structure. For example, in one representative, non-limiting embodiment, the lip 34 may be co-extruded together with the body 32. The material composition of the lip 34 may be the same as or may differ from the composition of the body 32.

In the alternative, the lip 34 may formed as a separate part that is adhered to or otherwise fastened or connected to the body 32.

In addition, the lip 34 may be advantageously coated with a suitable material in order to minimize scraping, creaking or flapping noises. For instance, a variety of non-friction coatings may minimize noise production. Many types of non-friction coatings are known in the art and may be suitable for reducing noise production between the door plate 42 and the door panel component 10. Non-friction coatings of aluminium, PPA, PPS, and PEAK thermoplastics, polyvinyl chloride, acrylic resin, and other types of low-friction coatings may be used. Preferably, a low-friction coating having a coefficient of friction of 0.2-0.4 between the door plate 42 and the door panel component 10 may yield desirable results.

In addition or in the alternative, the lip 34 is preferably dimensioned so as to cover at least a part of the edge 14 of edge flange 12. The lip 34 may optionally cover the entire edge 14. The lip 34 may extend partially between the edge 14 of the door panel 10, as shown in FIG. 2, in order that the lip 34 is not visible from the passenger compartment, thus yielding a more pleasing aesthetic appearance. Alternatively, the lip 34 may extend beyond the edge 14 of the door panel 10. This configuration may yield improved noise-reducing characteristics, and may provide advantageous properties concerning wear, such that the lip 34 is less likely to displace such that it no longer lies in the interface between the door plate 42 and the door panel component 10.

The damping component 30 can be formed in the shape of a band or strip, so that the damping component 30 extends in one-piece along the entire edge flange 12 or along nearly the entire edge flange 12. However, the damping component(s) 30 can also be formed as a plurality of individual pieces disposed around the respective brackets 16. The plurality of pieces can be disposed along the edge flange 12, e.g., directly adjacent to each other or with intervening spaces therebetween. In FIG. 1, the lip 34 of the damping component 30 is wider than the body 32 thereof, whereas in FIGS. 2-5, the lip 34 has the same width as the body 32. Thus, the lip 34 may not have the same length as the body 32 in certain embodiments.

The body 32 may be designed to ideally interface with a bracket 16 such that the bracket is substantially surrounded by the body 32, while still allowing convenient installation of the body 32 and the bracket 16. In the case of a bracket 16 as described with respect to FIGS. 2, 3, and 5, the body 32 may have a recess 46 configured to receive and/or surround the bracket 16. In a representative, non-limiting embodiment, the body 32 may include a projection 36 (see FIG. 3) configured to detachably engage and/or retain the bracket 16. For example, the underside of the top wall 24 of the bracket 16 may elastically contact or otherwise engage a ledge 48 of the damping component 30. More preferably, the projection 36 may protrude, at least partially, into the interior of the recess 46 of the bracket 16 and may engage or contact the covering wall 24 from below.

The body 32 may also preferably include at least one peripheral flange 40 (see FIGS. 2, 3 and 5) that extends inwardly into the recess 46 of the body 32. Such a peripheral flange 40 is preferably configured to detachably engage and/or elastically retain the bracket 16 by contacting the covering wall 24 from above, as shown in FIGS. 2 and 3. More preferably, the bracket 16 and the damping component 30 are preferably designed to provide a clip-fit or snap-fit connection, when the bracket 16 is disposed within the damping component 30.

Before attaching the damping component 30 to the door panel component 10, the head of a plunger pin 38 may be pushed into the double-walled top wall 24 and securely retained therein. After attaching the damping component 30 to the door panel component 10 via the bracket 16, the peripheral flange 40 may at least partially cover and/or engage the covering wall 24 and may surround the plunger pin 38.

The door panel component 10 is then connected to the door plate 42 by inserting the respective plunger pins 38 into corresponding holes formed in the door plate 42, whereby the plunger pins 38 latch or detachably lock or engage in the respective holes. As is apparent from FIGS. 2 and 4, the edge 14 of the panel component 10 is supported on or disposed adjacent to the door plate 42 and the lip 34 of the damping component 30 is at least partially disposed between the edge 14 and the opposing surface of the door plate 42. In certain applications of the present teachings, it may be preferable for the lip 34 to extend completely between the edge 14 and the door plate 42.

Because the edge 14 does not directly contact the door plate 42, scraping, creaking or flapping noises caused by the panel component 10 moving relative to the door plate 42 can be minimized or eliminated. Furthermore, the door plate 42 also preferably does not directly abut the covering wall 24 of the bracket 16. Instead, the peripheral flange 40 of the damping component 30 is preferably disposed between the bracket 16 and the door plate 42, so that the door panel component 10 also does not directly contact the door plate 42 in this location.

If the body 32 of the damping component 30 has a length in its resting state (i.e. when not disposed between the panel component 10 and the door plate 42) that is greater than the height of the edge flange 12 (as measured from the base portion 13) and/or the height of the bracket 16, then the door plate 42 will be elastically tensioned or biased in the direction away from the door panel component 10 due to the elastic compression of the damping component 30. This elastic biasing force further assists in retaining the door panel component 10 on the door plate 42 in a manner that will dampen impacts or vibrations in case the vehicle door is slammed shut. Naturally, a door that can shut quietly, even if slammed shut, imparts a pleasant acoustic impression to the customer.

The present damping component 30 can, as previously indicated, be attached to the door panel component 10 in a simple manner and in a clearly-defined position. Consequently, in addition to the advantages of reducing or eliminating scrapping, creaking or flapping noises and also damping vibrations, the present teachings may also, in certain embodiments, provide the further advantage of a simple assembly.

Of course, the damping components of the present teachings, which have been illustrated herein for usage with a door panel component, can be inserted between a variety of other types of components to be attached to each other, where direct contact might lead to flapping, creaking or scrapping noises. In other words, the damping components are not particularly limited to vehicle applications and can be utilized in a wide variety of fields for connecting two components together.

For instance, the damping components described herein may be useful for the interface of the interior and exterior portions of a trunk lid, a hatchback, an instrument panel, and the interior of a vehicle and the exterior frame to which it is mounted.

The damping component 30 also may optionally include a groove 44 designed to receive and retain a cable 45 or other assembly part, for example, a Bowden cable. Naturally, the damping component 30 may be designed to perform additional functions, as necessary for the particular application.

Each of the various features and teachings disclosed above may be utilized separately or in conjunction with other features and teachings to provide improved damping components and assemblies containing such damping components, as well as methods for designing, manufacturing and using the same. Representative examples of the present invention, which examples utilize many of these additional features and teachings both separately and in combination, were described above in detail with reference to the attached drawings. This detailed description is merely intended to teach a person of skill in the art further details for practicing preferred aspects of the present teachings and is not intended to limit the scope of the invention. Therefore, combinations of features and steps disclosed in the detailed description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The invention claimed is:

1. A damping component adapted to be disposed between a base component and a panel component that is attachable to the base component, the damping component comprising:
   a body adapted to be disposable in a space located between a base component and the panel component when the panel component is attached to the base component, and
   a lip extending from the body and adapted to be disposed between the panel component and an opposing surface of the base component such that the panel component is prevented from directly contacting the base component,
   wherein at least one of the body and the lip are comprised of an elastic material, and
   wherein the elastic material is elastically-compressible, and wherein a dimension of the body is greater than the space between the base component and the panel component when the base component and the panel component are connected, such that the body is compressed when the panel component is attached to the base component.

2. The damping component according to claim 1, wherein the elastic material is a polyurethane foam material.

3. A damping component adapted to be disposed between a base component and a panel component that is attachable to the base component, the damping component comprising:
a body adapted to be disposable in a space located between a base component and the panel component when the panel component is attached to the base component, and
a lip extending from the body and adapted to be disposed between the panel component and an opposing surface of the base component such that the panel component is prevented from directly contacting the base component, wherein at least one of the body and the lip are comprised of an elastic material, and
further comprising an anti-friction coating disposed on at least one surface of the lip.

4. A damping component adapted to be disposed between a base component and a panel component that is attachable to the base component, the damping component comprising:
a body adapted to be disposable in a space located between a base component and the panel component when the panel component is attached to the base component, and
a lip extending from the body and adapted to be disposed between the panel component and an opposing surface of the base component such that the panel component is prevented from directly contacting the base component, wherein at least one of the body and the lip are comprised of an elastic material, and
wherein at least one recess is defined in the body and dimensioned to receive a bracket, wherein the bracket attaches the base component to the panel component.

5. The damping component according to claim 4, wherein the bracket further comprises a plunger pin retained thereon.

6. The damping component according to claim 4, wherein the body has a projection extending in a direction perpendicular to the at least one recess, wherein the projection is configured to engage a bottom surface of an upper wall of the bracket, thereby detachably retaining the bracket within the damping component.

7. The damping component according to claim 4, wherein the body further comprises a flange extending into the at least one recess and perpendicular to the at least one recess, wherein the flange is configured to engage a top surface of an upper wall of the bracket, thereby detachably retaining the bracket within the damping component.

8. The damping component according to claim 1, wherein the lip is integrally formed with the body.

9. The damping component according to claim 8, wherein the lip is coextruded with the body.

10. The damping component according to claim 1, wherein the damping component is formed in the shape of an extended strip disposable around at least a portion of the periphery of the panel component.

11. The damping component according to claim 10, wherein the extended strip is configured to be disposed around the entire periphery of the panel component.

12. An assembly comprising:
a panel component attached to a base component, and
a damping component according to claim 1, disposed between the panel component and the base component such that the lip of the damping component is at least partially disposed between a portion of the panel component and the corresponding opposing surface of the base component, wherein the portion of the panel component does not contact the base component.

13. The assembly of claim 12, wherein the lip extends around the entire periphery of at least one of the panel component and the base component.

14. The assembly according to claim 10, wherein the base component is a metal component of a vehicle door and the panel component is configured to be positioned an interior area of a vehicle.

15. The assembly according to claim 12, wherein the damping component is disposed around a bracket extending from the panel component.

16. The assembly according to claim 15, wherein the damping component comprises a flange at least partially disposed between the bracket and the base component, such that the bracket does not contact the base component.

17. The assembly according to claim 12, wherein the panel component comprises a supporting layer and a covering layer, the covering layer optionally comprising leather or a synthetic material.

18. The assembly of claim 12, wherein the body is elastically compressed between the panel component and the base component, such that the body exerts a separating force against the panel component and the base component.

19. The damping component of claim 1, wherein the body further comprises a recess extending through the body and dimensioned to receive a Bowden Cable.

* * * * *